L. J. MEREDITH.
TIRE.
APPLICATION FILED MAR. 3, 1919.

1,363,743.

Patented Dec. 28, 1920.

L. J. Meredith, Inventor

Witness

By C. A. Snow & Co.
Attorneys

UNITED STATES PATENT OFFICE.

LAWRENCE J. MEREDITH, OF RUPERT, IDAHO.

TIRE.

1,363,743.

Specification of Letters Patent.

Patented Dec. 28, 1920.

Application filed March 3, 1919. Serial No. 280,210.

*To all whom it may concern:*

Be it known that I, LAWRENCE J. MEREDITH, a citizen of the United States, residing at Rupert, in the county of Minidoka and State of Idaho, have invented a new and useful Tire, of which the following is a specification.

This invention relates to a new and useful improvement in resilient tires and more particularly to those of the type used in connection with automobiles or the like.

An object of this invention is the provision of a plurality of members adapted as a substitute for the inner tube now in use in pneumatic tires or a plurality of members that may be constructed within the ordinary pneumatic tire casing during its process of manufacture, or may be manufactured separately for insertion within casings of any size now on the market, thus producing a single tube tire which eliminates the use of air as a means for inflating said tire.

A further object of this invention is the provision of a tire having an expanding member and a contracting member as means for supporting the casing without employing air pressure.

A still further object of this invention is the provision of a complete single tube tire provided with a road shock absorbing cushion and a member adapted to produce the same resiliency within said tire as that produced by air pressure within the ordinary pneumatic tire.

With the above and other objects in view this invention resides in the novel features of construction, formation, combinations and arrangements of parts, to be hereinafter more fully described, claimed and illustrated by the accompanying drawings, in which:—

Figure 1:
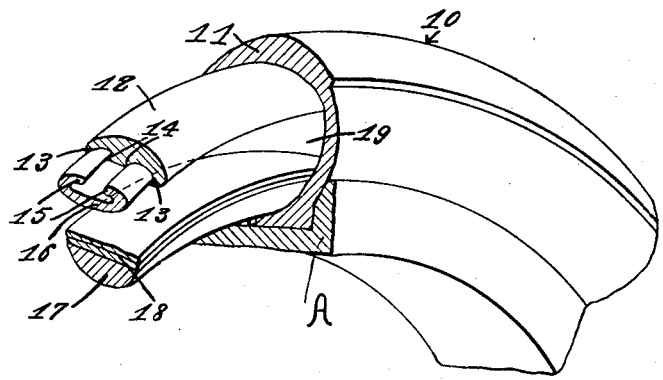
Figure 2:
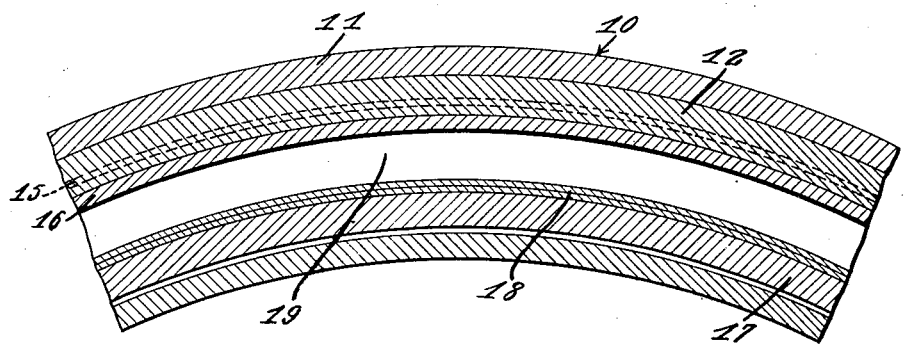
Figure 3:
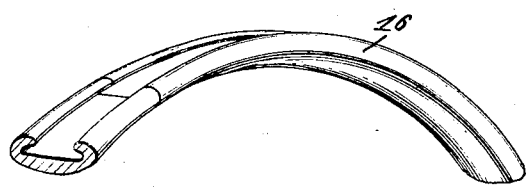

Figure 1 is a fragmentary perspective view of a casing and rim embodying my invention, Fig. 2 is a longitudinal sectional view thereof, and Fig. 3 is a fragmentary perspective view of a modified form of tread band, illustrating a split or joint therein.

Referring to the accompanying drawings by similar characters of reference throughout, the numeral 10 denotes in general my improved tire which consists of a casing of the customary type and designated by the numeral 11 having formed integral therewith and directly beneath the tread thereof an absorbing cushion 12 composed of any suitable material approximately the same width as the tread and having a plurality of grooves 13 formed therein with oppositely extended ribs 14 between the grooves. The grooves 13 are adapted to receive the outwardly extended ribs 15 of a corresponding curvature to that of the interior of the grooves 13 and formed integral with an expansion ring or tread band 16 which is composed of steel or any other suitable material. Thus it will be readily seen that said grooves 13 coöperating with the ribs 15 of the tread band 16 produce a means for keying said tread band 16 to the absorbing cushion 12 in a similar manner to that by which a clencher rim engages and substantially clenches the pneumatic tire in position thereon and by referring to Fig. 1 of the accompanying drawing it will also be seen that the concavity of the casing 11 adjacent to the tread thereof is utilized for the reception of the absorbing cushion 12 and expansion ring or tread band 16 only while the concavity of said casing 11 adjacent to the rim is utilized for the reception of a filler 17 composed of rubber or any other suitable material the horizontal surface of which is concealed by a belt or band 18 composed of any suitable fabric or other material which as illustrated by the accompanying drawing is applied in two thicknesses if desired or may be made integral therewith and so built in connection with the filler 17 as to assume a position within said casing 11 that will elevate said belt or band 18 above the rim A which engages the casing 11 in the customary manner as clearly illustrated by Fig. 1 of the accompanying drawing.

It will thus be readily understood by referring to the accompanying drawing, that a suitable space or chamber 19 exists for permitting play for the forced movement of the inner and outer members, which may be caused by obstructions commonly met with in road beds. This space or chamber assists greatly in absorbing the road shocks and also adds great resiliency to the tire as will be readily understood.

It is now thought that the above description, together with the accompanying drawings sufficiently sets forth the construction of this tire, to enable those familiar with this art to readily understand the construction, and many advantages of the same.

It should be understood, however in this connection that various minor changes in the details of construction may be resorted to within the scope of the appended claims, without departing from or sacrificing any of the advantages of this invention.

From the foregoing disclosures taken in connection with the accompanying drawings, it will be manifest that I have provided a tire, which is simple in construction, and will fulfil all of the necessary requirements of such a device.

Having thus fully described this invention, what I claim as new and desire to protect by Letters Patent is:—

1. A tire comprising a casing, a cushion therein having means for engagement with a band, a band engaging said means, a belt in spaced relation to said band and a filler supporting the same.

2. A tire comprising a casing, a cushion therein, means carried by said cushion for keying a band thereto, a band keyed to the cushion by said means, a belt in spaced relation to said band, a chamber intermediate said band and belt, and a filler supporting said belt.

3. A tire comprising a casing, a cushion therein, a band engaging the same, a belt in spaced relation to said band and a filler having its transverse surface concealed by said belt.

4. A tire comprising a casing, a cushion therein, having a plurality of grooves formed therein, a band having a plurality of ribs formed thereon for engagement with said grooves, a belt in spaced relation to said band and a filler supporting the same.

In testimony that I claim the foregoing as my own, I have hereto affixed my signature in the presence of two witnesses.

LAWRENCE J. MEREDITH.

Witnesses:
 J. C. BRAY,
 GEO. PANDEL.